United States Patent [19]

Van Mannekes et al.

[11] 4,167,619

[45] Sep. 11, 1979

[54] PURIFICATION OF PROPYLENE POLYMERIZATION PRODUCT

[75] Inventors: Abraham Van Mannekes, The Hague; Ross T. Channon; Jan W. De Beukelaar, both of Amsterdam, all of Netherlands

[73] Assignee: Shell Development Company, Houston, Tex.

[21] Appl. No.: 898,349

[22] Filed: Apr. 21, 1978

Related U.S. Application Data

[63] Continuation of Ser. No. 775,488, Mar. 8, 1977, abandoned, which is a continuation of Ser. No. 646,443, Jan. 5, 1976, abandoned.

[30] Foreign Application Priority Data

Jan. 7, 1975 [GB] United Kingdom ................... 582/75

[51] Int. Cl.$^2$ ............................. C08F 6/02; C08F 6/28
[52] U.S. Cl. .................................... 528/483; 526/351; 528/493; 528/494; 528/496
[58] Field of Search ................ 528/483, 493, 494, 496

[56] References Cited

U.S. PATENT DOCUMENTS

| | | | |
|---|---|---|---|
| 2,974,132 | 3/1961 | Jacobi | 260/94.9 |
| 3,112,299 | 11/1963 | Borrows et al. | 528/496 |
| 3,130,186 | 4/1964 | Siggel et al. | 528/483 |
| 3,287,343 | 11/1966 | Kutner | 260/93.7 |
| 3,496,156 | 2/1970 | Luciani et al. | 528/483 |
| 3,775,389 | 11/1973 | Hundmeyer et al. | 528/496 |

FOREIGN PATENT DOCUMENTS

| | | | |
|---|---|---|---|
| 821610 | 8/1969 | Canada | 528/483 |
| 840861 | 7/1961 | United Kingdom | 528/483 |

*Primary Examiner*—Stanford M. Levin

[57] ABSTRACT

This invention is directed to an improved method for the work-up of the reaction product from stereospecific polymerization of propylene with Ziegler Type catalysts in a liquid phase polymerization process employing a $C_3$ reaction medium. The product work-up comprises treatment of the reactor effluent slurry with a small amount of a $C_3$ or $C_4$ alkanol and with oxygen or an effective peroxide, followed by washing of the polymer with a $C_3$ hydrocarbon medium containing a small amount of a $C_3$ or $C_4$ alkanol.

7 Claims, No Drawings

PURIFICATION OF PROPYLENE POLYMERIZATION PRODUCT

This is a continuation of application Ser. No. 775,488, filed Mar. 8, 1977 which is a continuation of Ser. No. 646,443, filed Jan. 5, 1976 both now abandoned.

BACKGROUND OF THE INVENTION

1. Field of the Invention

This invention relates to an improvement in the production of polypropylene. More specifically, it relates to a process for the purification of propylene polymers produced by contact with a Ziegler Type catalyst in liquid phase in a $C_3$ hydrocarbon medium.

2. Description of the Prior Art

The polymerization of propylene by contact with so-called Ziegler or Ziegler-Natta catalysts comprising essentially titanium trichloride and an aluminum alkyl compound is a well developed art. Commercial processes for production of polypropylene predominantly employ a liquid hydrocarbon medium of higher boiling point than propylene as diluent in the polymerization reaction. It is also known to conduct the polymerization in a medium consisting of propylene which may contain minor amounts of propane and possible small amounts of other hydrocarbon components.

The crude propylene polymers obtained in this way contain catalyst residues which may adversely affect the properties of the polymer. By "catalyst residues" is meant the catalyst and any decomposition products or derivatives thereof which may be formed during the polymerization.

The removal of these catalyst residues is usually termed "deashing" and the deashing efficiency is generally denoted by the percentage of titanium which is removed from the polymer during the purification. This is given by the expression Deashing efficiency $= 100 \times (Ti_{initial} - Ti_{final})/(Ti_{initial})$.

This definition is usually chosen because titanium can be determined more accurately than, for example, aluminum, and, moreover, the removal of other elements broadly follows that of titanium.

In addition to catalyst residues, the polymerization reaction product also contains some hydrocarbon-soluble propylene polymer components, usually referred to as atactic polypropylene, which it may be desirable to remove in whole or in part prior to recovery of the desired propylene polymer product.

Many different methods have been disclosed in the art for treating propylene polymerization reaction product for deactivation of catalyst components, removal of deactivated catalyst components and removal of undesired atactic polymer. A number of different methods are employed in commercial propylene polymerization processes.

Among the known methods, it is common to contact the total reaction product, which is a slurry of polypropylene particles in hydrocarbon diluent, with an alcohol to convert the active catalyst residue to catalytically inactive compounds of titanium and aluminum. It is also common to wash out the deactivated catalyst residues by contacting the slurry with an alcohol or with an aqueous medium or with a hydrocarbon.

It has also been disclosed to employ oxygen or compounds which liberate oxygen, such as organic peroxides, in the polymerization product work-up. A very early patent including such disclosures is British Pat. No. 840,861 to Petrochemicals Limited. This patent discloses subjecting a Ziegler polymerization product to the action of an oxidizing agent such as air or peroxide and also to the action of a liquid reagent for decomposing the catalyst. The liquid reagents disclosed are lower aliphatic alcohols or other organic hydroxy compounds such as glycols, as well as water, dilute aqueous acid or "other liquid reagents suitable for use in decomposing Ziegler catalysts". It is said that the oxidation treatment results in making the catalyst remnants removable by treatment with an alcoholic or other liquid reagent to a substantially greater extent and more easily than previously possible. A later disclosure of utilizing oxygen or oxygen-liberating compounds in the treatment of polyolefin reaction products is found in Canadian Pat. No. 821,610 to Montecatini. This patent is directed to purifying olefin polymers by contacting the crude polymer suspended in a hydrocarbon medium with an oxygen donor substance in the presence of a Lewis base so as to transform the catalyst residues into compounds which are soluble or finely dispersible in the hydrocarbon medium and which then can be removed from the polymer by filtration and washing with the same hydrocarbon used in preparing the polymer suspension. The Lewis bases disclosed are aromatic compounds, ethers, amines, olefins, nitrogen-containing heterocyclic compounds, etc. The examples of this patent disclose very effective removal of catalyst residues by a process in which a crude propylene polymerizate was filtered, the residue washed twice with boiling heptane, the polymer reslurried in heptane, dry air bubbled through the slurry for an hour at 92° to 94° C., and the polymer then washed five times with boiling heptane.

SUMMARY OF THE INVENTION

The present invention provides a process for the purification of a propylene polymer obtained by polymerization by contact with a catalyst comprising a titanium halide and an organoaluminum compound, which process comprises (a) contacting a slurry of the polymer in a liquid $C_3$ hydrocarbon medium with from 0.01 to 7%W (based on the liquid phase) of a $C_3$-$C_4$ alcohol and with at least 0.1 mole of oxygen, or an equivalent amount of a peroxide, per gram atom of titanium present in the slurry, (b) washing the polymer with a liquid $C_3$ hydrocarbon medium in the presence of from 0.01 to 20%W (based on the wash liquid) of an alcohol, and (c) recovering the washed polymer.

DESCRIPTION OF THE PREFERRED EMBODIMENTS

Propylene is usually polymerized in the liquid phase with the aid of a trivalent titanium compound, in particular $TiCl_3$ and an aluminum dialkyl halide activator, as described, for example, in U.S. Pat. Nos. 3,562,239 and 3,857,795 and in U.K. Pat. No. 1,372,440. The polymerization is generally carried out in the presence of a liquid hydrocarbon diluent in which the polypropylene is substantially insoluble. This leads to the formation of a slurry comprising solid polypropylene, the catalyst remnants and the diluent. The process of this invention is particularly directed to the treatment of slurries containing, as the liquid hydrocarbon medium predominantly propylene, optionally together with a minor proportion of propane and possibly small amounts of other light hydrocarbons. Such a liquid is referred to herein as a "liquid C₃ hydrocarbon medium".

The slurry concentration, i.e. the weight percentage of solid polypropylene present, may be from 10 to 65% W, preferably from 25 to 55%W, and most suitably from 30 to 50%W.

While this invention is primarily directed to the work-up of propylene homopolymer, it can also be employed in the work-up of thermoplastic random or block copolymers of propylene with monoolefin co-monomers, typically ethylene. The term "propylene polymer", as employed herein, includes such copolymers.

The alcohol used in step (a) is an alkanol having 3 or 4 carbon atoms. Isopropanol, 1-butanol and 2-butanol are suitable. The use of 2-butanol has proved advantageous in avoiding corrosion problems in the equipment used for the process. Mixtures of alcohols may also be used.

When the slurry is treated with the alcohol, the catalyst is inactivated and in part solubilized. Contact times are usually at least 2 minutes, and preferably from 3 to 15 minutes. The alcohol is added to the slurried polymer in an amount of at least 0.01%W and not more than 7%W—based on the liquid phase; the preferred range of alcohol concentration is from 0.01 to 2%W, and the most preferred range from about 0.1 to about 1.0%W.

The slurry is also contacted with oxygen or a peroxide which acts as an oxygen donor, in order to achieve a substantially complete decomposition and solubilization of the catalyst remnants. The use of oxygen is generally preferred; it is recommended to employ the oxygen in admixture with an inert gas, especially nitrogen. Suitable mixtures may contain from 0.1 to 25%v $O_2$, preferably from 0.3 to 20%v $O_2$; particularly preferred are $O_2/N_2$ mixtures containing from 0.3 to 10%v $O_2$. Effective peroxides useful as oxygen donors are those which have a half-life time of about one hour at a temperature within the range 50°–175° C., preferably 60°–140° C. A particularly preferred peroxide is dilauroyl peroxide.

The amount of oxygen which contacts the reaction product is suitably in the range from 0.1 to 50 mole/-gram atom (gat) Ti, preferably from 0.2 to 2.5, and in particular from 0.25 to 2 mole $O_2$/gat Ti. When a peroxide is used, an amount equivalent to those mentioned above may be applied, for example from 0.25 to 2 mole of dilauroyl peroxide per gat Ti.

The contact with oxygen may be carried out simultaneously with the introduction of the alcohol, but is preferably carried out after the introduction of the alcohol into the slurry. Effective stirring to provide an intimate contact between gas and liquid is desirable. The contact time may vary between wide limits, but generally lies between 1 and 50 minutes, and most suitably between 5 and 30 minutes. When a peroxide is used, this may be added together with the alcohol, in one portion, or gradually over a period of time ranging e.g. from 1 to 50 minutes, preferably from 5 to 30 minutes.

Since the decomposition of the catalyst may be accompanied by the formation of hydrogen halide which could give rise to corrosion problems, a scavenger for the hydrogen halide, preferably propylene oxide, may be added together with the alcohol. The scavenger is preferably employed in amounts ranging from 0.5 to 20 mole per gat Ti, suitably from 1 to 15 mole per gat Ti.

Preferred temperatures for step (a) are from 20° to 80° C., in particular from 20° to 60° C.

The treatment with oxygen or an oxygen donor is conducted in the liquid state, at sufficiently high pressure to maintain liquid conditions.

After step (a) the slurry is washed in step (b) with a liquid C₃ hydrocarbon medium in the presence of an alcohol and the polymer is thereafter recovered as by flashing off residual wash liquid.

The wash liquid of step (b) is similar to the hydrocarbon medium used in step (a), comprising predominantly propylene, optionally containing a minor proportion of propane and possibly small amounts of other light hydrocarbons.

Surprisingly, it has been found that the deashing efficiency is increased very considerably by the presence of a low concentration of alcohol in the wash liquid. The alcohol is of the same type as that used in step (a).

The amount of alcohol used in the washing step (b) is at least about 0.1% and not higher than 7%W, for example from 0.1 to 2.0%W and most preferably from about 0.1 to about 1.0%W of the wash liquid. The washing may be carried out at a temperature from 10° to 80° C., preferably 30° to 50° C. Preferably the washing is carried out with agitation.

In a batch process, the bulk of the liquid phase may be removed from the slurry, for example by filtration, and the polymer contacted with fresh portions of the mixture of liquid hydrocarbon medium and alcohol. Very few such washings, usually two, are generally needed to achieve the desired purification.

In a preferred mode, the slurry is passed down a column through which a counter-current flow of the liquid washing medium is maintained. A slurry of washed polymer in clean wash medium is withdrawn from the bottom of the column while "dirty" wash medium, containing dissolved catalyst residue and atactic polymer is withdrawn overhead.

Polymer is recovered from the washed polymer slurry. This is suitably accomplished by flashing off the wash liquid.

While the process of the invention may be conducted batchwise, it is highly suited to be carried out as a continuous, or semi-continuous operation.

The purified polypropylene recovered after separation from the liquid phase, has excellent mechanical properties, e.g. a yield stress of 37.5 MN/m².

EXAMPLE

Deashing of a Slurry of Polypropylene

The experiments were carried out in a 2½ - liter autoclave of stainless steel provided with external heating equipment, stirring and intake facilities and a "Hoke" filter (40-55) which was located close to the bottom of the autoclave to permit filtration of the slurry and removal of the filtrate through an outlet in the bottom of the autoclave.

The slurry of polypropylene had been obtained by mass polymerization of propylene, the catalyst having been prepared by reduction of $TiCl_4$ with $Al(C_2H_5)_3$, as described for example in U.S. Pat. No. 3,857,795 using pentane as a diluent. The polymerization had been carried out in accordance with the procedure described in the UK patent specification No. 1,372,440 at 60° C. for about 6 hours, yielding about 3000 g of polypropylene (PP) per g $TiCl_3$. 600 Grams of the resulting slurry of polypropylene in propylene monomer was then transferred to the autoclave which had been flushed with nitrogen at 90° C. for 15 hours and cooled to 20° C.

it is clear that both measures combine in achieveing high deashing efficiencies according to this invention.

Table

| Exp. No. | Slurry concentration solid PP in slurry % w | Deashing Conditions | | | | | Ash Constituents | | | | | | Deashing efficiency |
|---|---|---|---|---|---|---|---|---|---|---|---|---|---|
| | | Decomposition | | | | Extraction | before deashing | | | after deashing | | | Percentage of Ti removed % |
| | | ROH in liquid phase % w | $O_2$/Ti ratio mol/gat | PO/Ti ratio mol/gat | introduction time $O_2$ min | ROH in liquid phase % w | Ti ppm | Al ppm | Cl ppm | Ti ppm | Al ppm | Cl ppm | |
| 1 | 34.3 | 0.44 | 0.45 | ca 8 | 30 | 0.5 | 90 | 293 | — | 5 | 28 | 63 | 94 |
| 2 | 31.5 | 0.42 | 0.49 | ca 8 | 30 | 0 | 90 | 293 | — | 31 | 47 | 72 | 66 |
| 3 | 39.4 | 1.3 | 0 | ca 9 | — | ca 1 | 137 | 567 | — | 84 | 17 | 160 | 39 |
| 4 | 44.8 | 1.2 | 0.36 | ca 9 | 15 | ca 1 | 129 | 386 | — | 16 | 33 | 55 | 88 |
| 5 | 24.9 | 1.0 | 1.1$^{a)}$ | ca 16 | 30 | ca 1 | 100 | 190 | — | 8 | 19 | 50 | 92 |
| 6 | 32.6 | 1.0 | 0.8$^{b)}$ | ca 10 | 15$^{c)}$ | 1 | 113 | 316 | — | 9 | 20 | 18 | 92 |

$^{a)}$the $O_2N_2$ mixture contained 5.0% v of $O_2$
$^{b)}$instead of $O_2$ a 5% w solution of dilauroyl peroxide (DLP) in isooctane was used; DLP/Ti = 0.8 mol/gat
$^{c)}$contact time with DLP.

Decomposition of the Catalyst

After having been diluted to the desired concentration with propylene, supplied from a cylinder pressurized with nitrogen, the slurry was heated with stirring to 55° C., whereupon a dosed mixture of 1-butanol (ROH) and propylene oxide (PO) was pumped into the autoclave. Stirring was continued at that temperature for 15 minutes, and an oxygen/nitrogen mixture containing 0.5%v $O_2$ was then gradually introduced, e.g. for 15 or 30 minutes. The autoclave was subsequently cooled to 40° C. in about 10 minutes, after which the bulk of the liquid contents was removed therefrom by filtration in about 30 seconds.

Extraction (Washing)

Extraction of solubilized catalyst remnants from the solid polypropylene was effected by addition in about 30 seconds of fresh propylene to the autoclave (kept at 40° C.) to replace the amount of propylene removed, the required quantity of 1-butanol being pumped in simultaneously. Subsequently, the mixture was stirred for another 60 seconds. The wash liquid was then removed by filtration and the operation was repeated. After a total of two extractions the remaining propylene was flashed off, and the purified polypropylene was recovered from the autoclave.

From the filtrates obtained, propylene was flashed off, and the residue worked up for analysis of titanium which was determined by means of X-ray fluorescence.

The polypropylene powder obtained was dried in a vacuum oven at 60°-70° C. to constant weight, after which it was analysed for the contents of Ti, Al and Cl by X-ray fluorescence.

Experimental conditions and results obtained are shown in the table below.

Comparison of Experiments 1 and 2 shows the striking increase in the deashing efficiency when as little as one half percent of 1-butanol is added to the wash liquid (propylene), while comparison of Example 3 with Examples 4, 5 and 6 demonstrates the dramatic effect on the deashing efficiency of an amount in the range from about one third to one mole of $O_2$ or equivalent peroxide in the decomposition step. From the results obtained

We claim as our invention:

1. A process for the purification of a propylene polymer obtained by polymerization with the aid of a catalyst consisting essentially of a titanium halide and an organoaluminum compound which process consists essentially of the steps of
   (a) contacting at a temperature in the range from 20° to 80° a reaction product slurry of the solid polymer in a liquid $C_3$ hydrocarbon medium consisting predominantly of propylene with (1) from 0.01 to 7% by weight (based on the liquid phase) of an alkanol having 3 to 4 carbon atoms per molecule and (2) an oxygen donor selected from at least 0.1 mole of oxygen and an equivalent amount of an effective peroxide, per gram atom of titanium present in the slurry, said oxygen donor being added simultaneously with or subsequent to the addition of said alkanol, but prior to any separation of the solid polymer from the liquid medium, and
   (b) washing the polymer, either by countercurrent contact of the slurry or after separation of the bulk of the liquid medium, at a temperature in the range from 10° to 80° C. with a $C_3$ hydrocarbon liquid medium consisting predominantly of clean propylene, free of catalyst residue, in the presence of 0.1 to 7% by weight (based on the wash liquid) of an alkanol having 3 or 4 carbon atoms per molecule, and
   (c) recovering washed polymer.

2. A process as claimed in claim 1 in which the polymer is a propylene homopolymer.

3. A process as claimed in claim 1 in which the oxygen is added in admixture with nitrogen in a volume ratio of $O_2:N_2$ from 0.3 to 10%.

4. A process as claimed in claim 3 in which the slurry is first combined with alcohol and agitated for 3 to 15 minutes and thereafter contacted with oxygen and agitated for 1-50 minutes.

5. A process as claimed in claim 1 in which the slurry in step (a) is contacted with dilauroyl peroxide as oxygen donor.

6. A process as claimed in claim 1 in which step (a) is carried out in the presence of a scavenger for the hydrogen halide formed.

7. A process as claimed in claim 1 in which step (a) is carried out at 20° to 60° C. and step (b) at 30° to 50° C.

* * * * *